United States Patent [19]
Cestonaro

[11] Patent Number: 5,582,504
[45] Date of Patent: Dec. 10, 1996

[54] APPARATUS AND METHOD FOR DETECTING ROWS OF OBJECTS

[75] Inventor: Jean Cestonaro, Marin, Switzerland

[73] Assignee: Fabriques de Tabac Reunies SA, Switzerland

[21] Appl. No.: 198,287

[22] Filed: Feb. 18, 1994

[30] Foreign Application Priority Data

Feb. 22, 1993 [EP] European Pat. Off. ............... 93810116

[51] Int. Cl.$^6$ ................................................. B65G 59/02
[52] U.S. Cl. ..................................... 414/796.9; 414/796.7; 414/786
[58] Field of Search ................................ 414/786, 796.7, 414/796.8, 796.9, 926; 294/907

[56] References Cited

U.S. PATENT DOCUMENTS 4,714,395  12/1987  Benuzzi et al. ................... 414/796.8 X
4,993,915  2/1991   Berger et al. ........................ 414/796.9
5,098,254  3/1992   Becicka et al. ...................... 414/792.9
5,139,387  8/1992   Boldrini et al. ................. 414/796.8 X
5,169,284  12/1992  Berger et al. ........................ 414/796.9

FOREIGN PATENT DOCUMENTS 2205300  12/1988  United Kingdom .

Primary Examiner—Karen B. Merritt
Assistant Examiner—Janice L. Krizek
Attorney, Agent, or Firm—Burns, Doane, Swecker & Mathis, LLP

[57] ABSTRACT

A depalletizer is provided for grasping and removing the rows of objects stacked upon a pallet. The depalletizer is equipped with feelers which probe the top layer on the pallet in order to find out which is the initial row present in the top layer. The probing cycle is carried out so that all the rows present in the top layer are detected, whereupon grasping of that initial row is triggered. The feelers also detect whether the top layer is oriented horizontally.

17 Claims, 4 Drawing Sheets

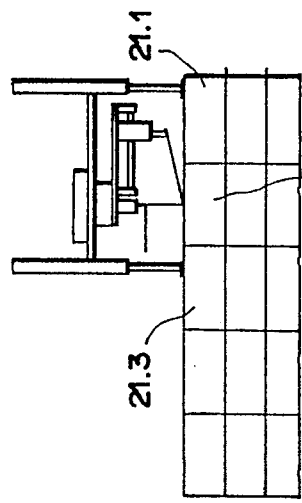
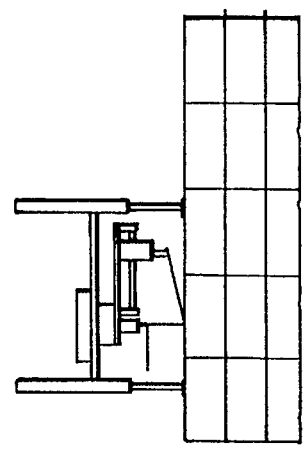
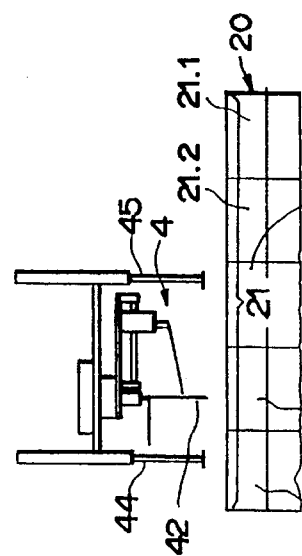
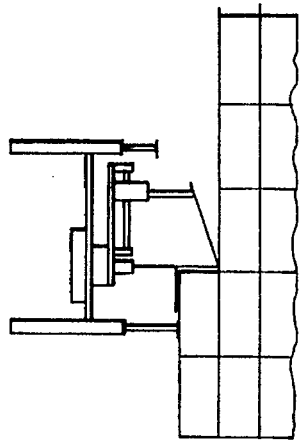
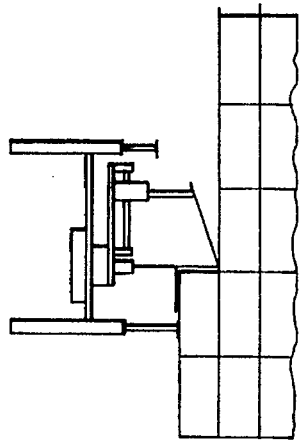
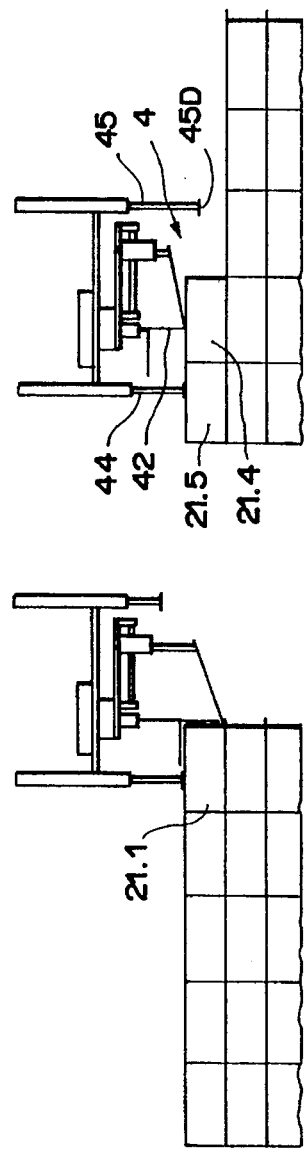

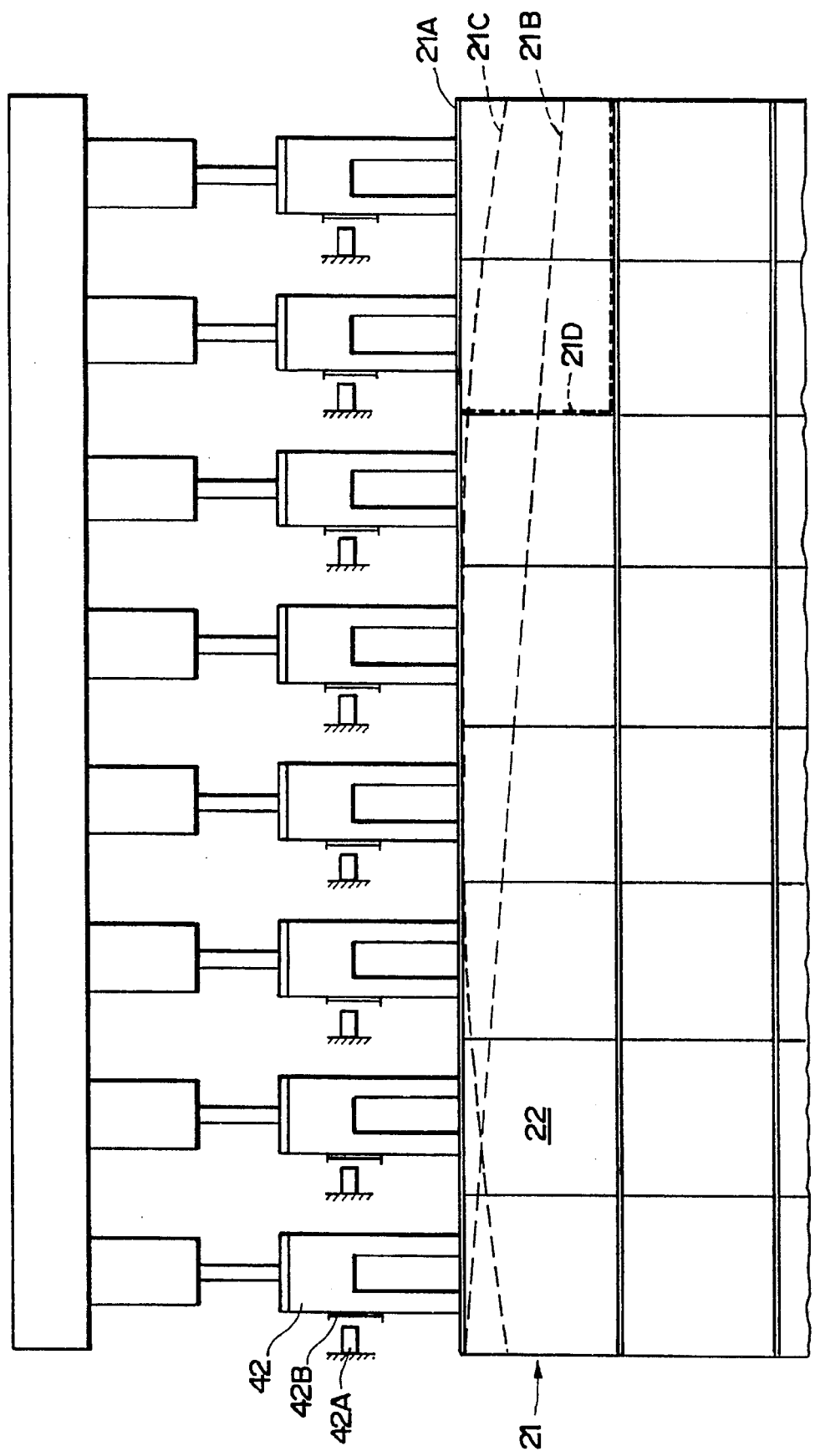

APPARATUS AND METHOD FOR DETECTING ROWS OF OBJECTS

BACKGROUND OF THE INVENTION

This invention relates to materials handling equipment, especially methods and apparatus by means of which objects disposed on a pallet can be withdrawn automatically, and more particularly to a method and apparatus for detecting the number of rows of objects in the top layer of a load of objects disposed in a plurality of rows over at least one layer. The invention further relates to a depalletizing method and a depalletizer incorporating the afore-mentioned detecting method and apparatus.

By means of a depalletizer disclosed in U.S. Pat. No. 4,993,915, an entire row of objects can be withdrawn automatically and simultaneously from the top layer of a load disposed on a pallet, either with the aid of the claws described in that patent or with the aid of those described in U.S. Pat. No. 5,169,284. The disclosures of U.S. Pat. Nos. 4,993,915 and 5,169,284 are incorporated herein by reference. Although the apparatus disclosed in these patents operates quite satisfactorily, its use is limited in that the top layer must be complete, i.e., all the rows of objects must be present, in order for the depalletizer to be able to start working completely automatically on a new pallet. Thus, the method of controlling this apparatus is such that when a new pallet is inserted in the machine, the grasping claws automatically move toward the first row of objects in the top layer. Now, it may happen that the top layer is incomplete when the depalletizer is supposed to start its cycle, either because one or more rows are missing when the pallet is inserted in the machine, or because the depalletizing cycle has been interrupted by a machine shutdown when a number of rows of objects have already been transferred, and the seizing cycle must be restarted. Until now, an operator has had to indicate manually the ordinal number of the first row to be seized. This procedure is a drawback to the extent that not only must there be an attentive operator present, but an erroneous indication may lead to the performance of one or more void cycles, hence a reduction in productivity of the machine, or to the damaging of one or more of the objects and/or of part of the depalletizer if a row present in the layer has been reported as lacking.

It is therefore an object of this invention to provide a method and apparatus making it possible to detect the configuration of the uppermost layer of a load disposed in layers and rows on a pallet in order to be able to bring grasping means into a position for withdrawing objects from the top layer.

Another object of the invention is to provide such a method and apparatus by means of which it is possible to detect automatically, without the intervention of an operator, which is the first row of objects to be seized at the beginning of a depalletizing cycle.

Still another object is to provide such a method and apparatus designed to be used on an existing depalletizer without any major modification of the means installed on that machine, and using these already existing means to the maximum.

A further object of this invention is to provide apparatus capable of detecting whether the top layer is horizontal and plane.

SUMMARY OF THE INVENTION

To this end, the detection apparatus according to the present invention comprises support means capable of moving along at least a horizontal axis X perpendicular to the axis Y of one of the rows, feeler means fixed to the support, means for moving the feeler means and the top layer closer to and away from each other along a vertical axis Z, the feeler means being made up of at least one feeler disposed so as to be able to detect the presence or absence of at least one row of objects, and control means capable of controlling the probing cycle.

In the method according to the present invention for detecting the number of rows of objects in the top layer of a load of objects disposed in a plurality of rows over at least one layer, a probing cycle is initialized, which controls the bringing up along a horizontal axis X of feeler means including at least one feeler capable of detecting the presence or the absence of at least one row of objects, above the first row or rows to be probed; then lifts the load along the vertical axis Z up to a position where at least one feeler detects the presence of a row, the lifting of the load then being stopped; then, in case the feeler or feelers detect the presence of the row or rows they overhang, moves the probing means and the top layer away from each other along a vertical axis Z, then moves the probing means along the horizontal axis X to bring them above the row or rows next to the row or rows, the presence of which has already been detected; then moves the feeler or feelers and the top layer closer to each other again along the vertical axis Z in order to detect the presence or the absence of the row or rows they overhang; the probing cycle continuing until at most the plurality of rows present on the top layer has been detected and being interrupted when at least one feeler detects the absence of a row or detects the first row present in the layer.

Although the following description relates to the inventive apparatus and methods adapted to a depalletizer of stacks of blanks intended for the tobacco industry, it will be understood that they may also be applied to stacks intended for other types of industry and, more generally, to other objects as well.

BRIEF DESCRIPTION OF THE DRAWINGS

Preferred embodiments of the invention will now be described in detail with reference to the accompanying drawings in which:

FIG. 3A is a diagrammatic elevation on a smaller scale of the grasping claw and detecting apparatus of FIG. 2 illustrating a step in the detection method as applied to one configuration of the top layer of the load of objects;

FIG. 3B is a diagrammatic elevation analogous to FIG. 3A, illustrating another step in the detection method;

FIG. 3C is a diagrammatic elevation analogous to FIG. 3A, illustrating another step in the detection method;

FIG. 3D is a diagrammatic elevation analogous to FIG. 3A, illustrating another step in the detection method;

FIG. 4A is a diagrammatic elevation on a smaller scale of the grasping claw and detecting apparatus of FIG. 2 illustrating a step in the detection method as applied to another configuration of the top layer of a load of objects;

FIG. 4B is a diagrammatic elevation analogous to FIG. 4A, illustrating another step in the detection method; and FIG. 5 is a diagrammatic end-on view illustrating the use of a row of feeler means for detecting whether the top layer of a load of objects is horizontal and plane.

DETAILED DESCRIPTION OF A PREFERRED EMBODIMENT OF THE INVENTION

Figure 1:
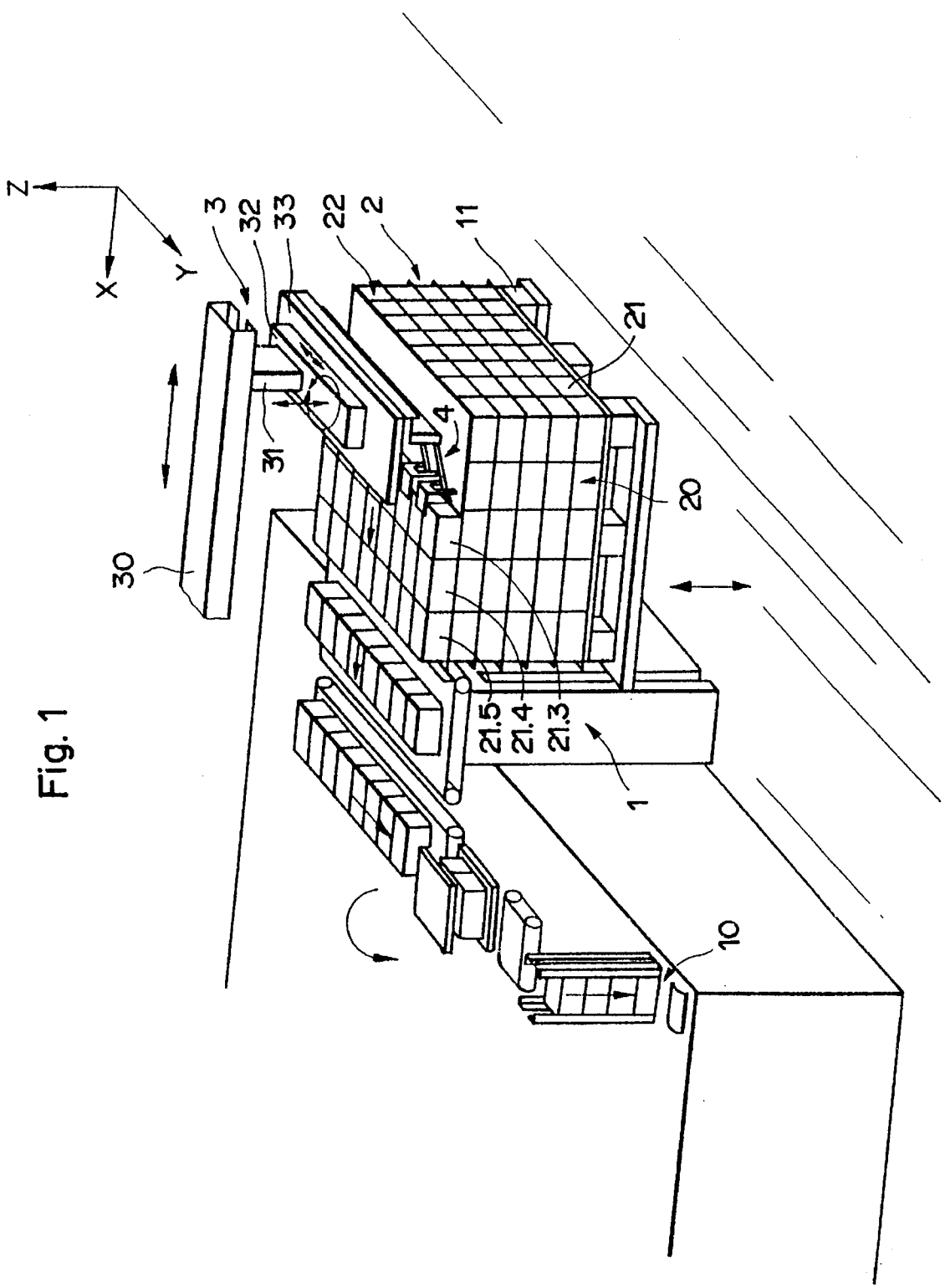
FIG. 1 is an overall perspective view of a depalletizer representing the general operating context of the inventive method and apparatus.

FIG. 1 shows a depalletizer 1 for feeding a packing machine 10 from a pallet 11 bearing a load 2 comprising a plurality of vertically stacked layers 20, each layer composed of a plurality of horizontal rows 21 of stacks 22 of blanks. In the case shown, the complete load 2 is normally made up of twelve layers 20, each having five rows 21.1–21.5 of eight stacks 22 (see FIG. 3A). Each stack has 250 blanks. Depalletizer 1 further comprises means 3 for displacing a blank-grasping device 4, composed of a rail 30 for moving a first carriage 31 along axis X, carriage 31 supporting a second carriage 32 which can move mainly along axis Y and, in certain embodiments, also along axis Z. Carriage 32 in turn bears a support 33 capable of pivoting about axis Z. The support 33 carries a claw device 4, by means of which an entire row 21 of blanks can be grasped simultaneously.

Figure 2:
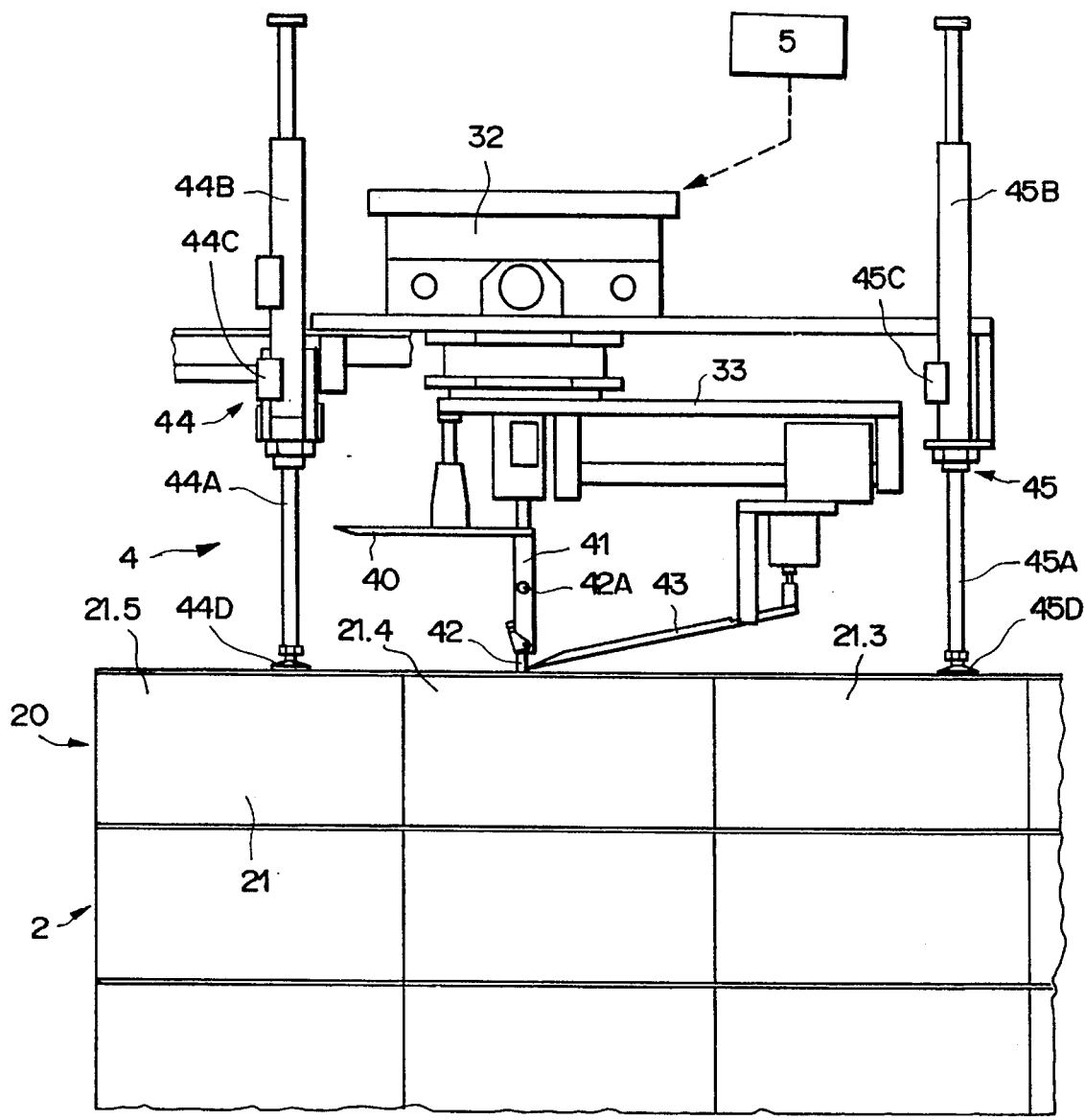
FIG. 2 is an elevation of a grasping claw provided with the inventive detecting apparatus disposed on part of a load of objects.

Part of claw device 4 is shown in more detail in FIG. 2. This device essentially corresponds to that disclosed in U.S. Pat. No. 5,169,284, mentioned earlier. It comprises an upper support plate 40, at the rear thereof and perpendicular thereto a vertical rear support plate 41, supporting a sensor in the form of a sweeper 42 which can slide vertically along plate 41, and a lower support plate 43. Device 4 is supplemented by at least one front sensor in the form of a feeler 44 and at least one rear sensor in the form of a feeler 45, each feeler composed of a rod 44A, 45A actuated by a double-action pneumatic or hydraulic jack 44B, 45B so as to be able to move vertically. By means of a sensor cell 44C, 45C disposed on each jack 44B, 45B, it is possible to know the exact position along the vertical axis of the tip 44D, 45D of each feeler rod. Sweeper 42, the position of which along axis Z is perceived by a sensor cell 42A disposed on vertical rear plate 41, constitutes a third, central feeler. The device is controlled by control means indicated by box 5.

FIGS. 3A–3D show the operation of the inventive apparatus and methods when layer 20 is complete, i.e., when it comprises, in the case illustrated, five rows 21 of objects, viz., stacks of blanks, each. In FIG. 3A, when the pallet is stopped at a height such that, however many layers it is carrying, movements of claw device 4 cannot cause any collision between that device and the top layer of load 2, the above-mentioned displacing means 3 has brought claw device 4 into its probing-cycle starting position, i.e., into a position where: (i) feeler 44 is suspended above the last row 21.5 of the top layer, (ii) the feeler constituted by sweeper 42 is suspended above the next to last row 21.4, and (iii) feeler 45 is suspended above the antepenultimate row 21.3. Feelers 44 and 45, as well as sweeper 42, are then lowered or released so as to descend to the bottom of their path along axis Z as shown in FIG. 3A. The pallet is then slowly raised along axis Z until at least one feeler (all three feelers in the case illustrated) is pushed from beneath and driven vertically up to a position where it actuates its appurtenant sensor cell (see FIG. 3B). The resultant signal causes the pallet to stop rising, as well as indicating the presence of a row under the feeler in question, as will be seen below.

In FIG. 3B, which is identical to FIG. 2 but on a different scale, the pallet has been lifted vertically so that the top layer has actuated at least one feeler as explained above. In the situation shown in FIGS. 2 and 3B, the tips of feelers 44 and 45, as well as sweeper 42, have each come in contact with a stack of blanks forming part of the row above which each of the foregoing elements is suspended, thus actuating sensor cells 42A, 44C, and 45C (not shown in FIGS. 3A–3D) and signalling the presence of the three respective rows.

The pallet is then lowered again, and claw device 4 is moved along axis X toward the front of the pallet (i.e., to the right in FIG. 3B) so that the three feelers 42, 44, and 45 are suspended over the foremost three rows 21 of the top layer, in which position the pallet is raised again, and the claw device lowered as previously described to carry out the probing operation, as shown in FIG. 3C.

Since the first three front rows 21.1, 21.2 21.3 are present on the pallet, the three sensor cells 42A, 44C, and 45C signal this fact, thus notifying the program of control device 5 that the top layer is complete. Consequently, the program instructs claw device 4 to assume the position for grasping the first row 21.1 of the layer, as shown in FIG. 3D. This grasping position, as well as the operations effected by claw device 4 for grasping that row, are described in aforementioned U.S. Pat. No. 5,169,284.

FIG. 4A shows a configuration of the top layer in which, for example, the three rows 21.1–21.3 normally foremost are missing. As in the previous case, claw device 4 has been placed above the location theoretically occupied by the last three rows, then the pallet has been raised until the top row arrives at the probing level. When feelers 42, 44, and 45 are actuated, they then detect only the presence of the last two rows 21.4, 21.5 by means of sensor cells 42A and 44C (not shown in FIG. 4A). As tip 45D of feeler 45 cannot rest upon any object, this situation is signalled by its sensor cell. This configuration of the layer is recorded by the program, which then instructs claw device 4 to assume the position for seizing the first row present on the layer, as shown in FIG. 4B.

The method of detecting other possible configurations of the top layer may easily be deduced from the examples described. If only the last row 21.5 of the top layer is present, for instance, the absence of the next to last row 21.4 is signalled by sweeper 42, i.e., by its sensor cell 42A. Although the procedure for detecting missing rows has been described during the first phase of detection, viz., when the claw device is suspended above the last three rows 21.3–21.5, the action of the inventive apparatus is identical when the claw device, having detected the presence of the last three rows, is placed above the first three 21.1–21.3, as in FIG. 3B, and can then detect the absence of the first row 21.1 or the first two rows 21.1, 21.2.

The probing and detection cycle will preferably be activated only when a new pallet is loaded in the depalletizer, or after the depalletizer has been stopped for any reason, thus necessitating restarting of its operating cycle. Thus, when the first row present has been detected, its ordinal number in the layer will be recorded in the program; and after that row has been grasped and transferred, the ordinal number of the row to be seized will be increased by one unit in order that the grasping device may go to seize the following row, and so on up to the end of the layer. Thereafter, the pallet will be raised by an amount equal to the height of one layer, the grasping device then going directly to seize the first row of the new layer, then the following rows, after the cardboard separator between the two layers has been removed by means disclosed in the prior art. As a modification, the probing cycle might also be activated prior to the grasping of each row of each layer.

Although the operation of the apparatus has been described in relation to the detection of a layer configuration normally comprising five rows, it will be obvious that the inventive method and apparatus may equally well be applied to the detection of a layer configuration comprising some other number of rows, the method being carried out in such a way that each row present is detected until either the layer is found to be complete or a row or rows are found to be missing.

Likewise, the operation of the apparatus has been described with initialization of the probing and detection cycle above the last row or rows to be subsequently grasped and transferred, i.e., in the embodiment of the depalletizer illustrated, the one or ones disposed immediately adjacent to the packing machine. However, it is just as possible to carry out the method so that the first row or rows probed are those disposed at the other end of the layer.

The apparatus has been described with one claw 40, 42, 43, whereas claw device 4 usually comprises a plurality of such claws in order to seize simultaneously all the objects, or all the stacks of blanks, making up the row. In a preferred embodiment of the inventive apparatus, each claw is provided with a sweeper 42, whereas only two feelers 44 and two feelers 45 are disposed in front and in back of each end of the row of claws 4, i.e., opposite the first and the last claw. This design permits in particular detection of the correct positioning of the top layer by detecting its position along a horizontal transverse axis (axis Y).

This additional possibility of using the feeler means is depicted in FIG. 5, which shows the eight sweepers 42 of a row 21 in probing position, the other elements of the claw device being omitted in order not to clutter the drawing. Indicated diagrammatically opposite each sweeper 42 is its sensor cell 42A, e.g., an optical cell, which detects the presence of an area 42B of each sweeper 42. When the top surface 21A of row 21 is planar and horizontal, i.e., a correct situation as shown in solid lines, each area 42B is facing the corresponding cell 42A, with the latter detecting both the presence of the stack and the proper height of the top surface of that stack. If surface 21A is not horizontal but inclined, as indicated by broken line 21B, or curved, as indicated by line 21C, or even in the case of one or more missing stacks, as indicated by broken line 21D, some of the sweepers 42 are no longer correctly aligned, so that the sensor cells 42A corresponding to these sweepers are no longer opposite detection areas 42B. This situation is immediately signalled to the program, which can then order an emergency stop of the machine. The length of detection area 42B on each sweeper allows adaptation to slight variations in slope or in planeness of the top surface, e.g., 20 mm difference in level, the claws being capable of adapting to this difference and correctly seizing each stack. If this difference in level is exceeded, i.e., if at least one detection area 42B is outside the measurement range of a cell 42A, the claws cannot adapt to this difference in level, and the process must be stopped in order not to damage either the blanks or the claws. Such detection of planeness and horizontality is preferably made by sweepers 42 since they are the elements closest to the claws; but the same operations might be effected instead either by feelers 44 or by feelers 45 if there are enough of them.

For a row of objects provided with a certain number of claws (i.e., eight in the foregoing instance), the preferred embodiment described above comprises two feelers 44 and two feelers 45 respectively disposed in front of and behind each end of the row of claws, i.e., opposite the first and last claws, all the feeler means being supported by the claw device 4. Besides that embodiment, various others may be considered. In another embodiment of the method, it is not the pallet which is lowered and raised for each probing operation but rather the feeler device which is capable of moving along vertical axis Z and which, after the pallet has been raised to the probing level, effects the necessary movements along axes Z and X in order to carry out the probing operations required for detecting the first row of stacks or objects to be seized. Likewise, and preferably if this latter embodiment of the method is chosen, the feeler means need not necessarily be borne by the same support as the claw device; an embodiment is also possible wherein the feeler means are borne by a support independent of that for the claws. The method is then carried out so that after detection of the configuration of the layer has been effected, the feeler means are moved away, and the claws are brought up to the first present layer detected before seizing it.

Although the apparatus has been described as probing three successive rows simultaneously, it is obviously also possible to equip the apparatus so that fewer or more than three rows are probed simultaneously Moreover, it is not absolutely necessary for each row of feelers to be equipped with two feelers, as in the embodiment described above; the row comprising feelers 44 and/or that comprising feelers 45 might have only one feeler disposed, for example, at one end or at the center of the row, or else eight feelers disposed in front and in back of each claw, the row comprising sweepers 42 preferably remaining complete in order to be able to detect whether the top surface of the row of objects is horizontal and plane, as described above.

The feeler means have been described as being mechanical elements of a given design; however, it is quite possible to envision these means differently, either also operating in mechanical form or being composed, for example, of proximity sensors or of optical means, the choice among these various modifications being made according to the type of object to be detected.

Thus, a depalletizer operating according to the inventive methods and equipped with the inventive apparatus can achieve automatically, without human intervention, the detection of the first row of objects, or stacks of blanks, to be seized, then depalletizing of the load of objects, and can do so reliably and with very little modification of the existing installation. According to the preferred embodiment described above, the inventive apparatus can furthermore be used to detect the horizontality and the planeness of the top layer.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for detecting the number of horizontal rows of objects in a top layer of a load of objects composed of at least said top layer, composed of a plurality of said rows, each row defining a horizontal first axis, said apparatus comprising:

support means, first displacement means for moving said support means along at least a horizontal second axis perpendicular to said first axis, sensing means attached to said support means and including at least one sensor capable of detecting the presence or absence of a plurality of said rows of objects, second displacement means for moving said sensing means and said top layer closer to and away from each other along a vertical axis, and control means for controlling said first and second displacement means.

2. The apparatus of claim 1, wherein said sensing means senses the presence or absence of the plurality of rows of objects when the second displacement means moves said sensing means and said top layer closer to and away from each other along the vertical axis.

3. The apparatus of claim 1, wherein said sensing means comprise one or more front sensors, one or more middle sensors, and one or more rear sensors for probing for the presence of at least three of said rows of objects simultaneously.

4. The apparatus of claim 3, further comprising seizing means for grasping said objects, said seizing means including one or more sweeper means constituting said one or more middle sensors and each of said sweeper means including auxiliary sensor means for detecting the respective position of said one or more sweeper means along said vertical axis.

5. The apparatus of claim 4, wherein said sensing means are fixed to said seizing means.

6. Apparatus for detecting the number of horizontal rows of objects in a top layer of a load of objects composed of at least said top layer, composed of a plurality of said rows, each row defining a horizontal first axis, said apparatus comprising:

support means, first displacement means for moving said support means along at least a horizontal second axis perpendicular to said first axis, sensing means attached to said support means and including at least one sensor capable of detecting the presence or absence of at least one of said rows of objects, second displacement means for moving said sensing means and said top layer closer to and away from each other along a vertical axis, and control means for controlling said first and second displacement means, wherein said sensing means comprise one or more front sensors, one or more middle sensors, and one or more rear sensors for probing for the presence of at least three of said rows of objects simultaneously, wherein each of said front sensors and rear sensors comprises a rod having a contact tip and including sensor means for detecting the respective position of said rod along said vertical axis.

7. A depalletizer equipped with apparatus for detecting the number of rows of objects in a top layer of a load of objects composed of at least said top layer, said top layer composed of a plurality of said rows, each row defining a horizontal first axis, said apparatus comprising:

support means, first displacement means for moving said support means along at least a horizontal second axis perpendicular to said first axis, sensing means attached to said support means and including at least one sensor capable of detecting the presence or absence of at least one of said rows of objects, second displacement means for moving said sensing means and said top layer closer to and away from each other along a vertical axis to detect the presence or absence of said at least one of said rows of objects, and control means for controlling said first and second displacement means.

8. The apparatus of claim 7, wherein the sensing means detects the presence or absence of a plurality of rows of objects.

9. The apparatus of claim 7, wherein the sensing means includes a plurality of sensors.

10. A depalletizer equipped with apparatus for detecting the number of rows of objects in a top layer of a load of objects composed of at least said top layer, said top layer composed of a plurality of said rows, each row defining a horizontal first axis, said apparatus comprising support means, first displacement means for moving said support means along at least a horizontal second axis perpendicular to said first axis, sensing means attached to said support means and including at least one sensor capable of detecting the presence or absence of at least one of said rows of objects, second displacement means for moving said sensing means and said top layer closer to and away from each other along a vertical axis, and control means for controlling said first and second displacement means, wherein said sensing means comprise one or more front sensors, one or more middle sensors, and one or more rear sensors for probing for the presence of at least three of said rows of objects simultaneously, the number of said middle sensors corresponding to the number of said objects in one of said rows, further comprising seizing means for grasping said objects, said seizing means including one or more sweeper means constituting said one or more middle sensors and each of said sweeper means including auxiliary sensor means for detecting the respective position of said one or more sweeper means along said vertical axis, said auxiliary sensor means including means for detecting a difference in height between at least two points aligned along the axis of the row of the top surface of a row of objects, and said control means being adapted to cause stopping movement of said depalletizer along the vertical axis when said difference in height exceeds a predetermined value.

11. A method of detecting the number of rows of objects in a top layer of a load of objects composed of at least said top layer, said top layer composed of a plurality of said rows, each row defining a horizontal first axis, said method comprising performing a probing cycle comprising the steps of:

A) displacing, along a horizontal second axis, transversely of said first axis, sensing means including at least one sensor capable of detecting the presence or the absence of at least one row of objects, such that said sensing means is disposed above said at least one row to be sensed, B) moving said sensing means and said top layer closer to each other along a vertical axis to a position where said at least one sensor detects the presence of or absence of said at least one row, C) separating said sensing means and said top layer from each other along said vertical axis when the presence of said row is detected, D) moving said sensing means along said horizontal second axis to a position above at least one additional row situated next to said at least one row, E) moving said sensing means and said top layer closer to each other again along said vertical axis in order to detect the presence or the absence of said at least one additional row, F) repeating steps A–E with respect to further rows until the presence or absence of all rows present on the top layer has been detected, and interrupting said probing cycle when said sensing means detects the absence of a row or detects the presence of a certain selected row.

12. The method of claim 11, comprising the further step of causing the probing cycle to cease when an error in horizontally of the first row detected exceeds a reference value.

13. The method of claim 11, wherein the movements of said top layer closer to and away from said sensing means along said vertical axis are effected by raising and lowering said load.

14. The method of claim 11, wherein the movements of said top layer closer to and away from said sensing means along said vertical axis are effected by raising and lowering said sensing means.

15. The method of claim 11, comprising the step of placing at least one sensing means above the position of a foremost row of the top layer at the beginning of the probing cycle.

16. A depalletizing method including a probing cycle comprising the steps of:

A) positioning, along a horizontal axis, sensing means including at least one sensor capable of detecting the presence or the absence of at least one row of objects in a top layer of a load of objects, the top layer having a plurality of rows thereon, such that said sensing means is situated above said at least one row, B) moving said sensing means and said top layer closer to each other along a vertical axis to a position where said sensing means detects the presence of a row, C) moving said sensing means and said top layer away from each other along said vertical axis when said sensing means detects the presence of said at least one row, D) moving said sensing means along said horizontal axis to position said sensing means above at least one additional row situated next to said at least one row, E) moving said sensing means and said top layer closer to each other along said vertical axis in order to detect the presence or the absence of said at least one additional row, F) repeating steps A to E until the plurality of rows present on the top layer has been detected, and interrupting said probing cycle when said sensing means detects the absence of a row or detects the presence of a certain selected row, the movements of said load closer to and away from said sensing means along said vertical axis being effected by raising and lowering said load, said depalletizing method further comprising a cycle of grasping said at least one row detected.

17. The depalletizing method of claim 16, wherein said rows are grasped and displaced, said method carried out such that as soon as a final row has been detected, its ordinal number in its layer is recorded in a control program, said final row and all previously sensed rows being grasped sequentially.

* * * * *